United States Patent [19]

Giles

[11] Patent Number: 5,380,957
[45] Date of Patent: Jan. 10, 1995

[54] PARTICLE WEIGHING APPARATUS AND METHOD

[76] Inventor: Alan F. Giles, 63, High Street, Hail Weston, St. Neots, Huntingdon, Cambs, PE19 4JW, Great Britain

[21] Appl. No.: 50,357
[22] PCT Filed: Nov. 12, 1991
[86] PCT No.: PCT/GB91/01990
   § 371 Date: May 4, 1993
   § 102(e) Date: May 4, 1993
[87] PCT Pub. No.: WO92/08958
   PCT Pub. Date: May 29, 1992

[30] Foreign Application Priority Data
   Nov. 14, 1990 [GB] United Kingdom ............ 9024731

[51] Int. Cl.6 .............. G01G 11/14; G01G 19/52; B67D 5/08
[52] U.S. Cl. .............. 177/16; 177/50; 222/55; 222/57
[58] Field of Search ........... 177/16, 50; 222/55–59, 222/77

[56] References Cited

U.S. PATENT DOCUMENTS

| | | | |
|---|---|---|---|
| 3,927,774 | 12/1975 | Teske et al. | 222/55 X |
| 4,092,721 | 5/1978 | Rueff et al. | 177/50 X |
| 4,122,715 | 10/1978 | Yokoyama et al. | 222/55 X |
| 4,238,956 | 12/1980 | Sniezek et al. | 73/861.01 |
| 4,574,896 | 3/1986 | Friedrich | 177/16 |

*Primary Examiner*—George H. Miller, Jr.
*Attorney, Agent, or Firm*—Lee, Mann, Smith, McWilliams, Sweeney & Ohlson

[57] ABSTRACT

A method of and apparatus for weighing particulate material, in which the particles are delivered onto a dish which is rotated to throw off the particles into a collector (7), the dish having an electric drive means powered from a controlled current source (1), and a circuit responsive to variations in the controlled drive current which produces an output signal representative of variations in said drive current due to transit of particles via the dish, thereby signalling meas flow.

36 Claims, 9 Drawing Sheets

Material Input

Fig. 1

Material Output

PARTICLE WEIGHING APPARATUS AND METHOD

FIELD OF THE INVENTION

This invention concerns apparatus and methods for weighing particulate material. In this context, particulate material means any material which can flow and divide and includes liquids, slurries and dry materials of a particulate nature and includes components, (semi-finished and finished) which are to be packed by weight, such as nails and screws, as well as electronic components and mechanical components for use in engineering and manufacture. Where the individual particles are of uniform weight, the apparatus and method may be used for batching by number.

BACKGROUND TO THE INVENTION

Many foods and other products are packaged in pre-portioned amounts in sachets, boxes, cups or bottles or are dispensed onto plates or mixed with other products in different proportions. Portioning into constant amounts prior to dosing into containers is not too much of a problem with powders and fine particulates or with liquids and pastes. More of a problem exists in the packaging of larger particulates such as peanuts, sweets, dried fruits, dried soups, dried cake decorations, pasta pieces, frozen peas, tablets, seeds, parts for engineering, electronic components, office requisites, pelleted petfood and horticultural products.

Portioning such materials into constant amounts for dosing into containers tends to be expensive and time consuming using available technology which in general is expensive and less than ideal for the task.

Some regular free flowing particulates can be portioned reasonably accurately by volume. Methods range from a simple measuring cup to automated conveyor belts consisting of a succession of cups which are filled and swept level. Mechanical volumetric slide gate dispensers are often used and in another method a quasi-constant flow of material is arranged to fall from a vibrator tray onto a "star wheel" which collects approximately equal amounts in each segmented compartment for subsequent release. Where such volumetric dispensing methods are satisfactory, they are probably the best choice since they are cheap and easy to maintain. However, for many applications, volumetric methods are not accurate enough since the materials do not pack equally into spaces, and examples of such products are wrapped sweets, dried vegetables and sea foods such as prawns. For these a weighing method has to be used in order to comply with current consumer legislation and not incur losses due to overpack and two weighing methods are in general use, linear weighing and combinatory weighing.

In linear weighing, a weigh bucket is mounted on an electronic weighing machine and a feeder such as a vibrator or conveyor belt is used to dispense material into the weigh bucket. As material accumulates in the bucket an increasing weight signal is received. The feeder activity such as vibrator amplitude is controlled until a given point is reached determined by the feedback weight signal at which stage it changes to a dribble feed until the right amount is reached at which point the feed is cut off. The product is then released from the bucket which is then rendered available to receive the next dose. The process is time consuming and if high dosing rates are required banks of linear weighers must be employed which render the whole exercise large and expensive and complex.

Where faster weighing is required with larger particulates and where an accuracy of better than a single particle is required combinatory weighing techniques must be employed. Here a computer is employed to select from a plurality of weigh buckets each containing relatively small quantities of the product involved, so as to produce a combination of weights which is nearest to the required weight. The chosen buckets are then discharged and refilled for a subsequent cycle.

Belt weighing techniques are also employed using a load cell and totaliser.

A further weighing apparatus involves changing the direction of the flow of bulk material by causing material to fall onto an inclined plate which is connected to a load cell and integrating circuit to produce an indication of mass flow.

A mass flow measuring system is also known in which the material is caused to react with a rotating disc, thereby imparting an inertial load on the disc drive system which can be measured as an increased torque demand. This demand can be measured and interpreted as mass flow rate. Such a system is described in U.S. Pat. No. 2,771,773, for example. However, the known system is particularly related to heavy industry and is suitable for the metering of such materials as coal, iron ore, bulk chemicals, etc. No equipment of the kind described in the U.S. patent and suited to light industry and packaging is known and no equipment for application in these fields is currently available. This is doubtless due to the fact that measurement of the forces generated by the passage of a few grams of material calls for an entirely different approach to that required for the measurement of tons of material. It is to the specific area of light weights of material that the present application is directed.

It is an object of the present invention to provide a simpler and faster mass flow measuring system employing a rotating disc, capable of being made sufficiently sensitive to enable its application to light weights of material.

SUMMARY OF THE INVENTION

According to one aspect of the present invention particulate material weighing apparatus comprises:
1. Means for delivering particulate material to a dish;
2. Electric drive means for rotating the dish;
3. A controlled electric current source for powering the electric drive means;
4. Rotational speed measuring means for measuring the instantaneous rotational speed of the electric drive means; and
5. Circuit means responsive to variation in the electric current powering the electric drive means and adapted to generate an output signal indicative of the changes in the instantaneous electric current supplied to the drive means, caused by the changes in loading as particulate material transits the dish.

Display means may be provided for indicating a value derived from the instantaneous drive current as a numerical value and this may be scaled so as to indicate weight per unit time.

Preferably the numerical value signals are accumulated so as to produce an overall weight value for the particulate material which has passed through the apparatus.

Integrated circuit means may also be provided capable of being reset after a weighing operation and adapted to produce an output signal whose value is the summation of the variations in the drive current caused by the acceleration of particles by the dish.

As mentioned previously, means may be provided for displaying the output signal from the integrating circuit means as a numerical value.

If the mass flow rate is simply to be monitored and recorded, the output signal from the first mentioned circuit means can be recorded as such and if a process is to be controlled in relation to the incoming or outgoing mass flow rate, the output signals from the said first mentioned circuit means may be used to control the process accordingly.

If batching by weight into a container is required, then the output signal from the integrating circuit can be used to determine when each batch weight has reached a predetermined point (just in advance of the target weight for the batch) at which point the input flow rate is reduced to "dribble feed". When the target is achieved the flow is stopped, and the now full container can be replaced by an empty one or the container may be emptied into another receptacle, to be ready to receive more product. The integrating circuit must be reset at the end of each batch, in preparation for the next dose.

Alternatively, for less critical applications the product discharging from the weighing apparatus can be diverted from one container to another instantaneously and simultaneously the integrating circuit means can be reset to begin the accumulation weighing process again.

Another way of achieving batching is to incorporate a shutter mechanism to collect the output of the apparatus and release it on demand. In this application, after the discharge of a measured dose, the apparatus totalises the mass flow of the next dose while it is accumulating on the shutter. While this is in progress a full container can be removed and replaced by an empty one. When the next dose is complete it is discharged and the process is repeated. This implies a process system in which the dosing machine is the master and the packaging machine is the slave. In the more usual case where the packaging machine is required to be the master then additional control means are required to achieve synchronisation.

Synchronisation with a packaging machine can be achieved by providing means on the packaging machine to signal the progress through each cycle, typically by signalling the angle of the drive means by means of an encoder or similar device. This signal may then be used to control the flow of material onto the dish such that the desired total amount is reached and the shutter operated when required. In the event of a machine stoppage then the flow into the dish will be interrupted. When the machine restarts the flow will resume thus maintaining synchronism.

In applications in which a dispensing means is employed, which produces batches of product of variable weight, these batches may be passed through weighing apparatus embodying the invention and batch weight can be ascertained and the batches and their associated weights can be stored for subsequent use, such as by a combination weigher, or for weigh-price labelling—although these two examples are given by way of example only.

Where the electric current requirement to achieve constant torque of the drive means varies during a single rotation due to non-constant characteristics of the drive means, the current requirements during a single rotation of the drive means and dish may be recorded in an appropriate memory in the form of a look-up table and the latter is then read in synchronism with subsequent rotation of the drive means and the output signal used to eliminate the electric current variations during weighing cycles caused by the non-constant torque current characteristic of the drive means.

A look up table method can similarly be used when variations of the electric current requirement signal to achieve constant speed are caused by imperfections in the speed measuring means.

A suitable memory device is a read only memory (ROM). Values for insertion in the read only memory may be obtained from off line measurements made on the drive means.

In one embodiment the drive signal is multiplied by the output of the ROM to form a modified drive current for the motor. In another embodiment the outut from the ROM is used to subtract the error from the mass flowrate signal to produce a substantially error free signal.

Instead of providing the values for the ROM look-up table from an off-line measurement of motor torque, it is possible alternately to provide the data from sampled values of instantaneous electric drive current during a calibration step. In this case the ROM is replaced by a RAM (random access memory) which may be battery backed so that data is preserved on disconnection of power. In this event if a multiplier is employed, it is used to modify the output signal of the said circuit means instead of the motor drive current. If the output of the RAM is used to subtract an error signal, then this can also be used to achieve zeroing of the system. In this case the RAM should desirably not be battery backed as an update will be required after disconnection of power.

The dish is preferably generally circular and may be mounted for rotation about a central and generally vertical axis. The dish includes a central upwardly pointing conical section and a radially outer region which extends from the periphery of the central conical section and includes a plurality of circularly spaced upstanding particle engaging elements (which will be referred to as ribs) which extend at least partly thereover in a generally radial direction.

The purpose of the upwardly pointing conical section referred to above is to direct the material towards the ribs in the outer section. In an alternative embodiment of this invention the centre section is made very shallow or substantially flat. Further, the energy transfer to the particulates is improved if the centre section, whether it be conical or flat, is provided with low height ribs which extend from the centre or solid area in the centre out to higher ribs in the outer region. Preferably the low height ribs are in line with and conformal with the outer ribs. With the improved energy transfer so obtained the impact with the higher outer ribs is more gentle, thus improving the particle trajectories and improving the measurement accuracy. Particulate flow can be further improved if the feeding means is directed only towards the part of the dish where the low height ribs are moving in the same direction as the horizontal component of motion of the incoming particles.

The radially outer region may be flat or dished or may be in the form of a frusto-conical surface extending generally upwardly and outwardly from the junction between it and the conical section.

Typically the ribs comprise thin plate-like members or vanes extending upwardly from the surface of the dish, at least at its radially outer region.

Each rib may be straight and radial in direction or curved (when viewed from above) in a direction opposite to the direction of rotation of the dish.

Although for many applications the dish is preferably mounted about a generally vertical axis for rotation, the invention is not limited to a dish when so mounted and for certain products it may be advantageous for the axis of rotation of the dish to be an an angle to the vertical.

A collector may be provided for receiving particulate material as it exits from the rotating dish. The collector typically comprises a housing which surrounds the dish.

It is of course important that any particulate material leaving the dish and colliding with the housing wall is not deflected back onto the dish. The shape or dimension or configuration of the interior of the housing must therefore be chosen so as to ensure that any particles flung off the dish are collected by the housing and not returned to the dish.

Where a cylindrical housing is employed the internal diameter and the characteristics of the surface material must be such that the impact of particles with the cylindrical internal wall is insufficient to permit the particles to be returned to the dish.

In general the transit time for a particle through the apparatus should be as short as possible. This is best achieved by using a small housing close to the dish so that trajectories are limited. In this event a preferred internal wall shape of the housing is frusto conical and the angle of the frusto conical surface is selected so as to ensure that particles impacting thereon are generally deflected downwardly.

In one embodiment the housing comprises a cylindrical wall with an inwardly directed flange at the upper end which may be frusto-conical in shape, and is shaped so as to optimise the change in direction of the particles impinging on it and the dish is located with the housing so as to register substantially with the frusto-conical flange. Where most of the particles leaving the dish do so in a generally horizontal plane, a useful angle for the frusto-conical boundary flange surface has been found to be 45° to the horizontal.

The particles may be collected within the collector by means of an inwardly directed vane extending from the inside of the cylindrical housing towards the dish so that the circular flight of particles around the interior of the housing is arrested and the direction of movement of the particles is changed to a generally downward one into, for example, a collecting bin, or onto a conveyor, located below the collector outlet.

The characteristics of the surface material in those parts of the apparatus where impacts with particles occur should be such that minimal damage is caused to the product. This may be achieved by constructing the impacting parts from a soft material or by providing a soft facing or coating layer.

A possible unwanted side effect is that the rotating dish with its ribs acts as a centrifugal fan, transporting air along with the material to be measured. This movement of air contributes to a demand on the motor in addition to that of the material. If the air movement is entirely constant its effect can be zeroed out and causes no problem. However, if variations in the air flow path occur, such as would be caused by the operation of a shutter blade or movement of containers beneath the discharge point, then such variations can cause unacceptable errors.

It is known, more especially from U.S. Pat. No. 4,574,896 to incorporate an air lock in the input of a rotating disc mass flow measuring system to prevent air flow and thus avoid the above-described air flow problem. The most useful and universally applied flow controlling means for particulates in low weight ranges is, however, a vibratory feeder. It would be difficult to incorporate an air lock with a vibratory feeder system as applied to the present invention, as vibratory feeders depend on a free air space in which to operate. Moreover, the requirement to mount the outlet of the vibratory feeder very close to the input point of the dish to obtain a rapid response time would preclude the fitting of any extra devices at this point.

In an embodiment of the present invention the air flow problem is greatly reduced by the provision of a bypass in which a passage is provided for the free flow of air separate from the pathway of the material. A further reduction of the airflow problem is achieved by restricting the aperture to the minimum practicable where the feeder enters the top of the apparatus thus minimising the total airflow.

The invention also lies in a method of determining the mass of particles supplied thereto, comprising the steps of:

1. Dropping or projecting particles onto a dish which is rotated at a substantially constant speed by an electric motor;
2. Measuring the current variations brought about by changes in torque caused by the acceleration of particles by the dish; and
3. Producing an output signal in response to variations in the drive current, the instantaneous value of which output signal is attributable to the mass of particulate material which has engaged the dish and is being accelerated thereby.

Summing or integrating the output signal over a given period produces a signal whose value is proportional to the total mass of particulate material which has reacted with the dish during the said given period.

The method may include the step of displaying the instantaneous signal or the integrated value of the signal as a measurement of the mass of the particles which have reacted with the dish.

The apparatus and method may include means for averaging the instantaneous value and means for displaying the averaged value as a running average, or as a signal to demonstrate a trend in the mass flow rather than the instantaneous value since for most purposes it is the average value which is more important than any particular instantaneous value of the mass flow through the apparatus.

In another aspect, the invention provides seed drilling apparatus comprising a weighing device as aforesaid for weighing seed, in combination with a seed hopper from which seed is fed into the device through a flow control device, and a drill head which constitutes the outlet of the weighing device.

The invention also lies in a device for broadcasting particulate material such as a seed, fertilizer or weedkiller in pelleted form, comprising a weighing device as aforesaid in combination with a hopper or other reservoir for the particulate material located thereabove and flow control means between the hopper and the weighing device to control the rate of flow of particulate material to the weighing device, through which the particulate material can exit.

Preferably the flow control means is opened or closed in response to a control signal device from the weighing device so as to maintain a substantially constant mass flow rate of a given desired amount.

The invention will now be described by way of example with reference to the accompanying drawings in which.

Figures 1, 1A:
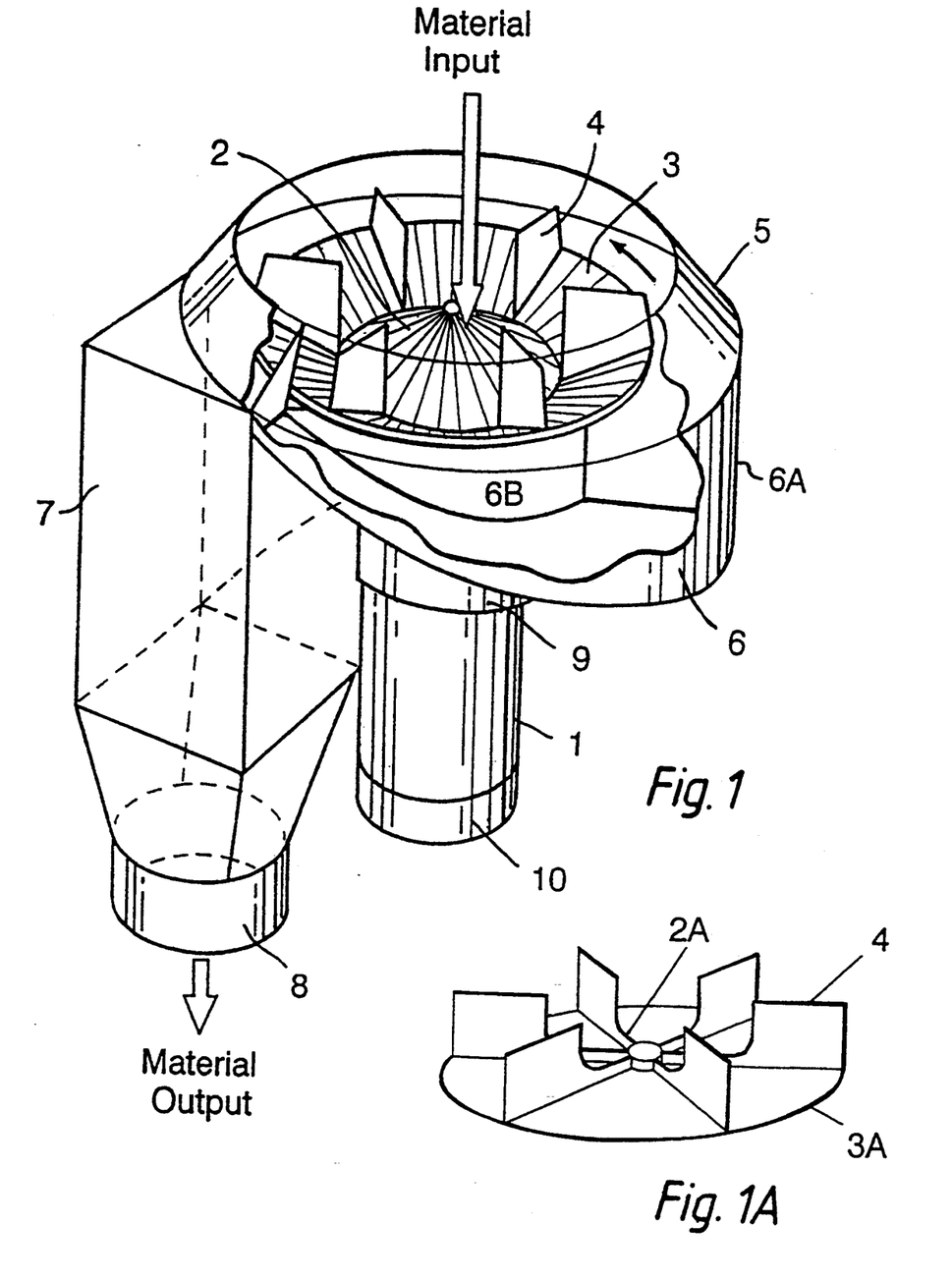
FIG. 1 is a perspective view of part of an apparatus incorporating the invention for weighing particulate material which is partly cut away to indicate internal structure.
FIG. 1A shows an alternative configuration of the rotating disc.

In FIG. 1 a direct current motor 1 drives a dish mounted thereabove which comprises an inner cone 2 and an outer upwardly directed frusto-conical section 3. Ribs or vanes designated by reference numeral 4 extend upwardly from the frusto-conical outer section 3.

The dish is contained within a generally cylindrical housing having a frusto-conical flange 5 may which surrounds the dish and serves to capture the particulate material exiting from the dish as the latter rotates and to change the direction of any such particulate material into a generally downward direction which approximates to a downward spiral. The cylindrical housing includes a downwardly spiraling floor section 6 which extends between the outer cylindrical wall 6a and an inner cylindrical wall 6b and a forms with the outer and inner cylindrical walls a chute down which particulate material will fall in a generally downward and spiral manner to enter a generally rectilinear box housing set which forms a tangential extension to the cylindrical housing wall 6a.

There is a gap (not shown) between the top of the inner cylindrical wall 6b and the bottom of the dish. This gap extends down between the motor 1 and gearbox 9, if fitted, to provide an airflow bypass extending from the edge of the dish to the atmosphere outside the apparatus. A perforated or mesh screen (not shown) may be fitted if required to prevent stray particles from entering the airflow bypass.

Particulate material entering the box 7 falls in a downward direction through the output chute 8 onto a conveyor or into a container (not shown). Alternatively a shutter mechanism (not shown) for the collection and release of batches of material can be fitted at this point.

The housing, frusto conical flange, spiral floor and rectilinear box housing are described in geometrical terms by way of example only. The apparatus may also be constructed more in the form of a shell such as a sea shell or snail shell so that the various parts merge into a downwardly spiralling tube.

The materials of construction, or the surface layer, of the parts of the apparatus onto which the particles impinge may be chosen to be soft so as to reduce damage to the product.

The motor 1 conveniently drives the dish through the gearbox 9 thereby enabling a higher rotational speed of the motor to be employed with attendant increase in control thereof although the gearbox intermediate the motor and the dish may not always be necessary.

An encoder 10 provides a pulse train at a rate proportional to the rotational speed of the motor.

In the alternative dish configuration of FIG. 1a, the inner section 2a is flat and provided with low height ribs 4a which connect with higher ribs or vanes 4 which extend upwardly from a substantially flat outer section 3a.

Figure 2:
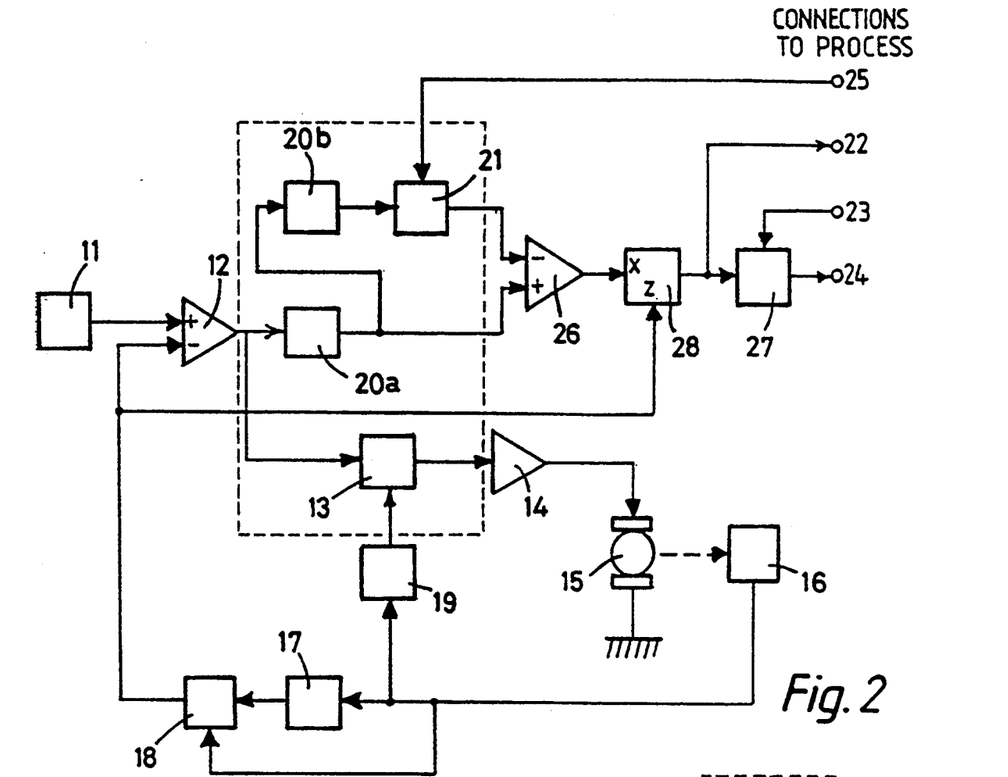
FIG. 2 is a block circuit diagram of a control electronics and signal processing circuitry associated therewith.

Referring now to FIG. 2, the rotational speed of the motor is set by a potentiometer 11 which supplies a demand signal to the signal amplifier 12. The output of the amplifier is fed via a multiplier 13 the purpose of which will be described later, to a power amplifier 14 which serves to supply current to a DC motor 15 (item 1 in FIG. 1).

An encoder 16 (item 10 in FIG. 1) generates a pulse train at a rate proportional to the rotational speed of the motor and this pulse train is fed to a voltage to frequency converter 17 which produces a triangular wave form the average amplitude of which is proportional to motor speed. Thus as motor speed increases the amplitude of the output signal of 17 increases and as it decreases the amplitude likewise decreases, the rate of change of speed of the motor determining the steepness or otherwise of the ramp in the output voltage from the voltage to frequency converter 17. Since it is only the changes in motor speed which are of interest, a sample and hold circuit 18 is synchronised by the pulse train from the encoder 16, to sample the amplitude of each trough in the output signal from 17. The signal from 18 thus constitutes a fast responding speed indicative signal which is free from the triangular wave distortion. An output signal from the sample and hold circuit 18 is supplied to the second input of the differential amplifier 12.

The polarity of the signal from 18 is arranged to be opposite to that of the demand signal so producing a speed control servo loop.

The operation of the circuit so far assumes that the torque per unit current of the motor is constant throughout the 360° of each revolution (given a constant input current). Few electric motors are produced which have such a characteristic and where the variation in torque during each individual rotation is appreciable, circuit means may be provided to compensate for this. It is for this reason that the multiplier 13 has been provided.

The multiplier 13 is supplied with two signals, one from the amplifier 12 and the other from a memory sub-circuit 19 having stored therein a series of values of current drive requirements per unit torque against angular displacement measured off-line. The memory sub-circuit 19, which consists of a read-only memory (ROM) and a digital to analogue convertor (DAC) together with local control circuitry, is addressed in synchronism with the pulse train from the encoder 16 so as to provide an output signal to the multiplier 13 the values of which provide constant angular speed throughout the 360° cycle of rotation of the motor. The memory sub-circuit 19 is not only addressed in synchronism with the motor rotation but is also synchronised so that the beginning of each 360° of rotation corresponds to the beginning of the string of values stored in the memory so that the appropriate values are read out in strict phase relationship with the rotation of the motor.

In the circuit shown, the multiplier 13 is an analogue multiplier and the output from memory sub-circuit 19 is fed to the X input and the output of the amplifier 12 is fed to the Y input. The resulting analogue multiplied output constitutes a drive signal to the power amplifier 14 which in a constant demand situation produces a constant signal from the sample and hold circuit 18 during each 360° of rotation.

The output of the signal amplifier 12 is also supplied to a filter 20a which decreases motor noise and the smoothed signal is supplied to a differential amplifier 26.

The output of the filter 20a is also supplied to a filter 20b which removes motor noise more completely and the smoothed signal is supplied to sample and hold module 21 which is caused to sample during periods when no material is flowing by a command from associated process plant through terminal 25 thereby to determine the steady state or quiescent signal value.

The quiescent current signal value held in 21 is fed to the other input of differential amplifier 26 so that the output of the amplifier represents only the signal due to the passage of particles. This signal is a measure of mass flow rate which is directly useful in some applications. This is shown as output 22.

An integrator 27 is provided to integrate the mass flow rate signal to provide a totalised mass signal at output 24. Commands from the associated process plant are fed in through terminal 23 to reset the integrator prior to an operational cycle involving the integration of the mass flow signal of particular material flow.

The motor drive servo system operates under proportional control and consequently there will be a small negative error in the speed of the motor whenever the dish is loaded by particles flowing over it. This error is found to be typically −4% under average loading conditions and the effect of this is to cause a similar reduction in the speed at which the particles are thrown off, thus giving rise a corresponding error in the weight signal. As the indicated weight is directly proportional to the rotational speed of the dish, by dividing the output by the rotational speed, this error can be substantially eliminated. For this reason a divider module 28 is included to which the signal from the differential amplifier 26 is fed in as input x. The speed signal from the sample and hold module 18 is fed into the divider module as input z. The output from the divider module (x divided by z) thus provides a corrected signal. A suitable divider module is Analogue Devices Real-time Analogue computational Unit AD538 connected as a one-quadrant divider.

Figure 2A:
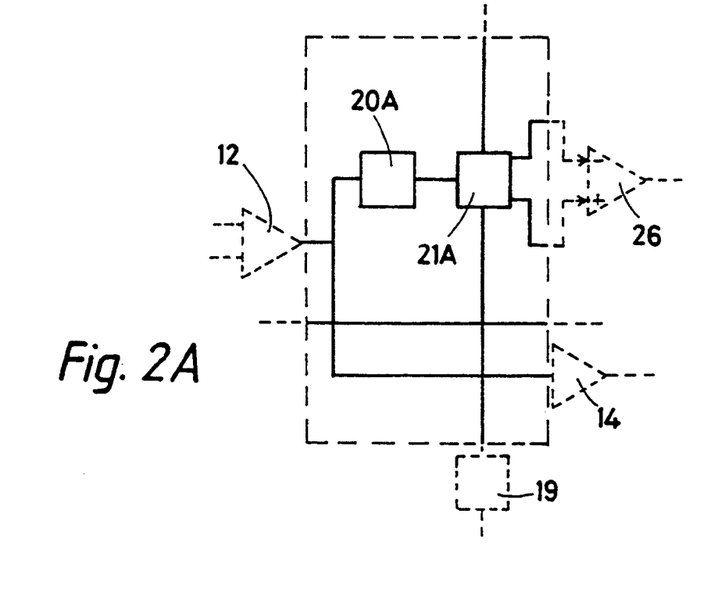
FIG. 2A shows a circuit modification.

FIG. 2A shows a circuit modification for the portion of FIG. 2 which falls within the box defined by the dashed line also indicated in FIG. 2A. This is applicable when variations of the electric current requirement signal to achieve constant speed are caused by imperfections in the speed measuring means.

During a calibration/zeroing operation the output of the filter 20a is fed via single routing circuitry 21a to the memory sub-circuit 19. In the implementation illustrated, the memory sub-circuit contains a random access memory (RAM) which stores an image of the output of filter 20a relative to the angular displacement of the motor. The memory image is built up over several cycles of the motor to provide an averaged image during a zeroing phae for the equipment as controlled from the process via terminal 25.

During normal operation this stored image signal is routed by module 21a to the negative input of the differential amplifier 26 where it is subtracted from the normal operational signal fed into the positive terminal. Thus both the actions of waveform correction and zeroing can be achieved.

In this embodiment, the functions of the differential amplifier 26 and the divider 28 can conveniently be combined in a single integrated circuit type AD534, supplied by Analog Devices.

The motor employed in the embodiment illustrated in the drawings comprises a Maxon RE 025-055-38EAA200A as supplied by Trident Engineering Limited. The sample and hold modules used are National Semiconductor LF398. The filters used are Linear technology LTC 1062CN8. The power amplifier for driving the motor is National Semiconductor LM12. The amplifier used for the integrator is LF411CN. The remaining components used are non-critical and industry standard devices may be employed.

A suitable speed for 120 mm diameter disc has been found to be 500 RPM. A suitable encoder provides 500 counts per revolution giving an encoder pulse rate of 4,167 Hz. A suitable value of transconductance for the motor drive power amplifier is 0.1 amps per volt for which value the following figures are quoted.

A typical value of quiescent current through the motor is 35 mA which corresponds to an input drive to the amplifier of 0.35 volts. Passage of 10 grams of material causes a current impulse through the motor of typically 40 mA seconds above the quiescent value. If the material transits the apparatus in 200 milliseconds this gives a voltage pulse of amplitude 2 volts and duration 200 milliseconds into the integrator. The integrator constant is chosen to suit the application and could, for example, be scaled to show 0.1 volts per gram.

It is to be understood that the embodiments illustrated in the drawings are intended by way of example only and there are many other ways of implementing the invention using analogue and/or digital techniques. Thus for example instead of providing the values for the look-up table in the memory sub-circuit 19 from an off-line measurement of angular displacement, it may be possible to provide the data from sampled values of instantaneous electric drive current during a calibration step. In this case the ROM could be replaced by a RAM (random access memory) which may be battery backed so that the data is not lost on disconnection of power. In this case also the analogue multiplier would be connected so as to modify the output of the differential amplifier 26, and the motor drive signal from the differential amplifer 12 could be amplified directly by the power amplifier 14.

It is also conceivable that using an appropriate gearbox and/or an appropriate design of motor, there may be no requirement for the memory sub-circuit 19, and analogue multiplier stage 13.

When metering small quantities of materials with the above-described apparatus forces involved are very small and it is important to optimise the performance and reduce undesirable side effects. Some ways of doing this have already been described. Additionally, however, the dish should be made as light as possible so that its own stored rotational energy is small, whereby when impacted by a particle and energy is transferred, the maximum instantaneous change of velocity is achieved, thus optimising the resolution of the equipment.

The selection and application of the motor bearings, and any extra bearings used to support the dish, may also be important, thereby to minimise the effect of the small but variable forces caused for example by the grease in conventional ball races. Thus ball races should be selected that are not over-large for the application and are lubricated by a low viscosity lubricant. It may be necessary to ensure that any shields or seals fitted to the ball races do not contribute a significant force. Where a heavy top bearing is required for operational reasons and residual forces are appreciable then a guard ring approach may be employed, wherein the outer ring of the ball races is rotated by a separate motor at the same speed as the main motor. The main ball race will thus only see the very small speed differences caused by the impact of particles.

Figure 3:
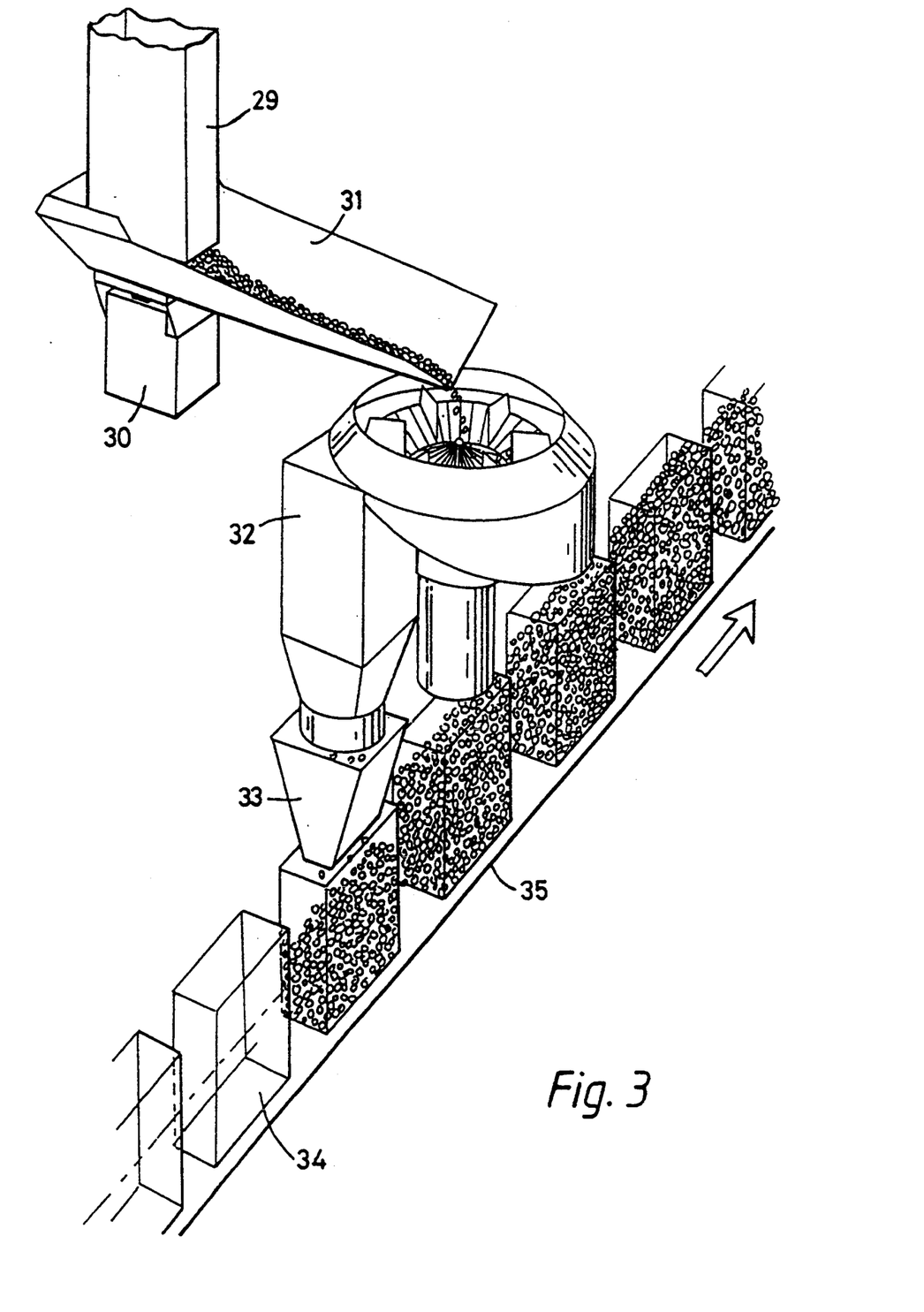
FIG. 3 shows a batching system incorporating the weighing apparatus.

FIG. 3 shows the machine of FIG. 1 incorporated into a batching system, of the kind sometimes referred to as a linear weigher. The particulate product is fed from a feed tube 29 into a vibrator tray 31 from which it is fed into the weighing apparatus by actuation of a vibrator 30. The weighing apparatus, generally referenced 32, has a convergent funnel 33 below its output. A conveyor 35 supports transparent plastics containers 34 which are filled from the funnel 33, the conveyor being stepped on through the appropriate distance after one container has been filled with product, more especially an accurately weighed amount of product, in order to bring the next empty container into position under the funnel. Generally, the vibrator 30, and possibly also the weighing apparatus 32, will be switched off while the conveyor is being stepped, and be switched on only while the conveyor, and thus the containers supported thereon, are stationary.

Figure 4:
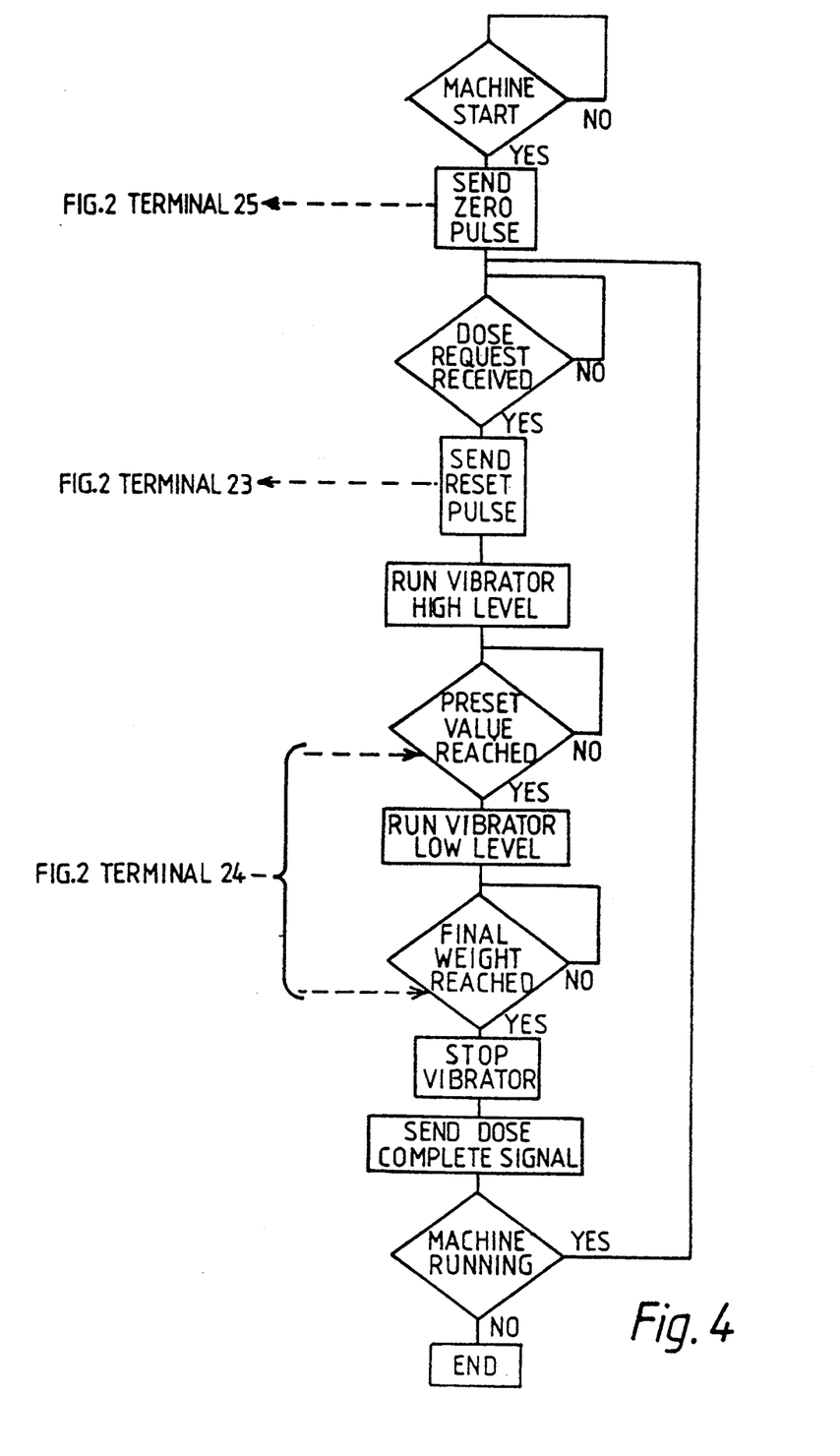
FIG. 4 is a flow chart associated with the system of FIG. 3 to be read in conjunction with FIG. 2.

FIG. 4 is a flow sheet which will be clear without detailed description when read in conjunction with the circuit diagram of FIG. 2. The flow chart could be applicable, for example, to the filling of one container in the batching system of FIG. 3.

Figure 5:
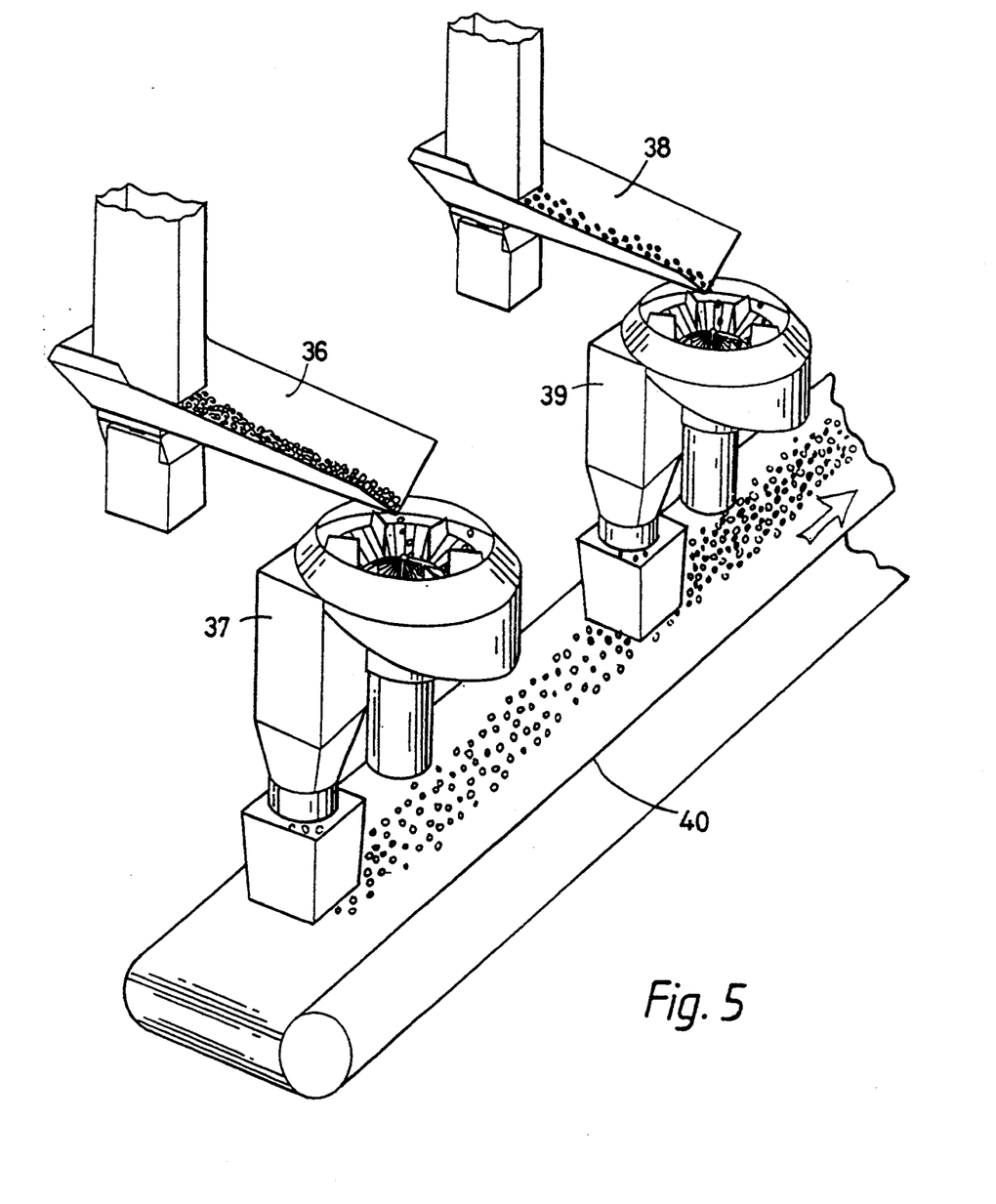
FIG. 5 shows a blending system incorporating the weighing apparatus.

FIG. 5 shows a blending system incorporating two weighing machines in accordance with the invention.

Vibrating tray 36 feeds one machine 37 with one type of particulate product and vibrating tray 38 feeds the other machine 39 with a second type of product. The machines 37, 39 discharge the respective types of product at controlled rates on to a constantly moving conveyor 40, which thus carries away a controlled mix of the two types of product.

Figure 6:
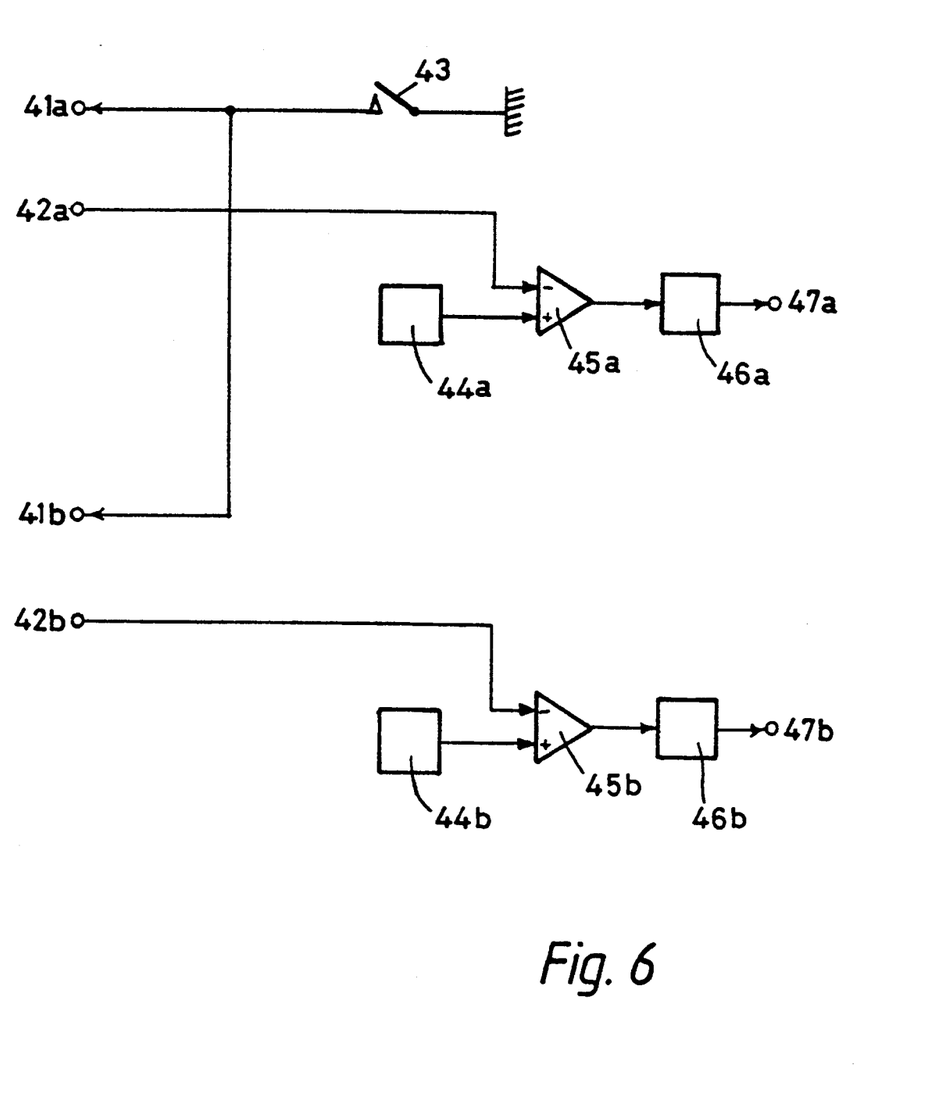
FIG. 6 is a block circuit diagram associated with the system of FIG. 5.

FIG. 6 is a block circuit diagram appertaining to the blending apparatus shown in FIG. 5. The switch 43 enables the system to be zeroed on start-up (and at other times if required) by feeding a signal to terminals 41a and 41b which are connected to terminal 25 on the main circuit for each machine as shown in FIG. 2. The potentiometer 44a sets the desired mass flow rate for the first particle dispenser 36, 37 in FIG. 5. The output from potentiometer 44a is fed into a differential amplifier 45a, as also is the instantaneous mass flow rate of the dispenser, connected from terminal 27 of FIG. 2 via terminal 42a of FIG. 6. The output of the differential amplifier 45a is fed into vibrator driver 46a which is connected to dispenser 36, 37 in FIG. 5. Similar connections apply for the second dispenser 38, 39. Thus while both dispensers are running, a controlled blend of product will be produced on the output conveyor 40.

Figure 7:
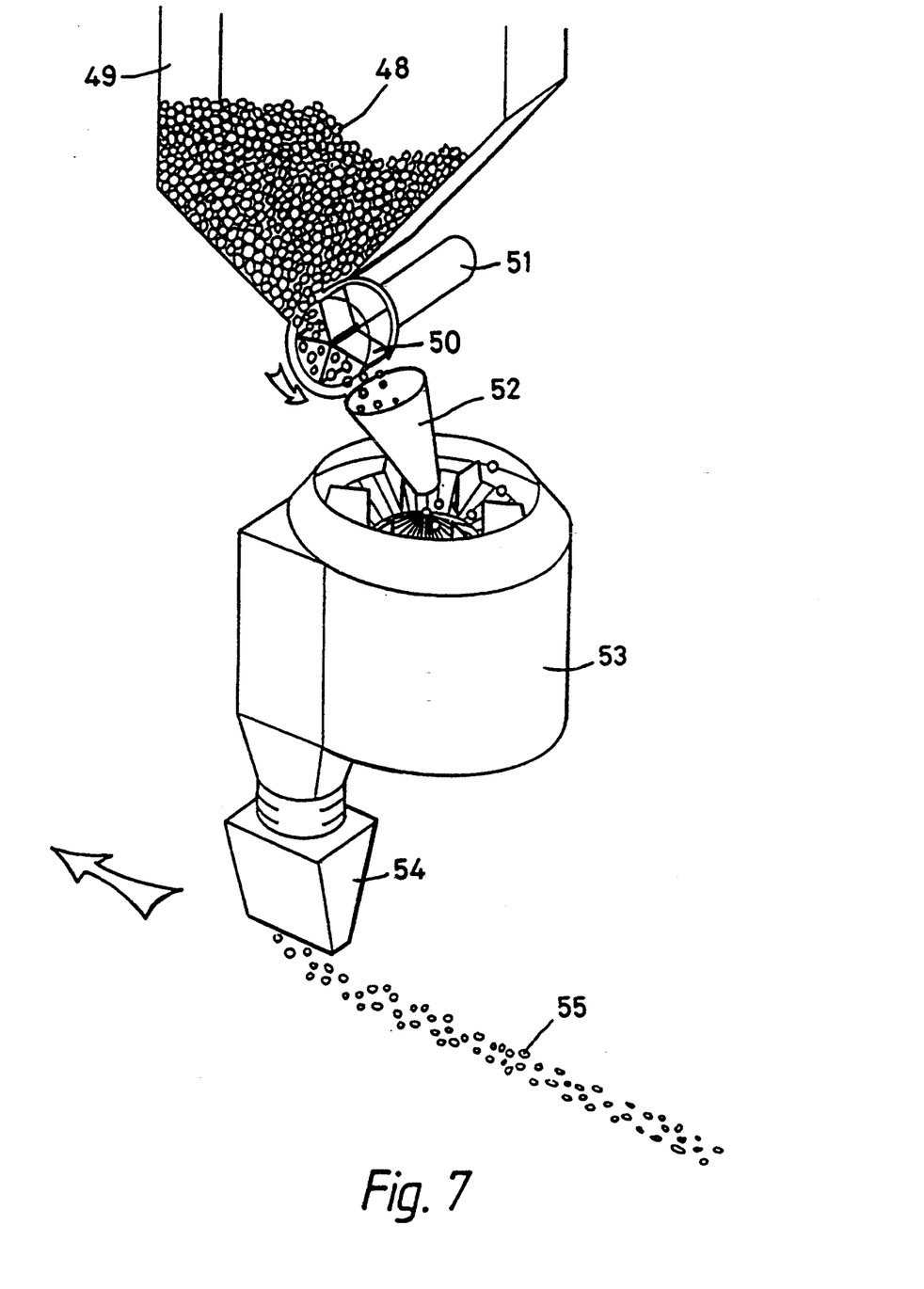
FIG. 7 shows a seed drill embodying the weighing apparatus.

FIG. 7 shows an application of the invention to seed drilling. Seed 48 in a hopper 49 (shown in a part-sectioned view) is metered out by paddle wheel 50 driven by controlled motor 51. The seed falls through the funnel 52 into the weighing apparatus 53. Seed from the outlet of the apparatus falls through a convergent funnel 54 to form a line of seed of controlled density, providing the carrying vehicle is driven at a constant speed in the direction of the marked arrow. Control of the equipment may be analogous to that of the blending application described with reference to FIG. 6.

Figure 8:
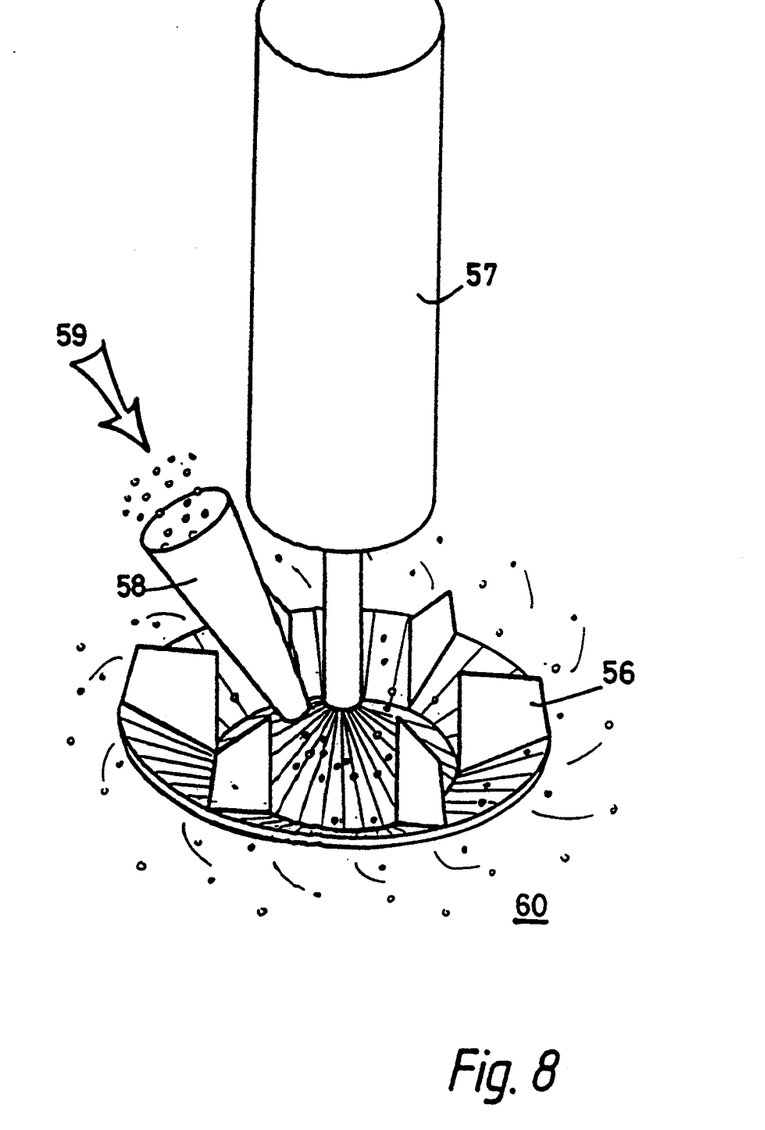
FIG. 8 shows a fertiliser spreader embodying the invention.

FIG. 8 shows a conceptual fertiliser spreader. A spinning dish 56 as previously described is suspended underneath its controlled drive motor 57. A funnel 58 presents fertiliser particles as near as possible to the centre of the dish. The funnel can be fed with material 59 by a similar method to that shown in FIG. 7. Particles are thrown off the dish in all directions 60, at a controlled rate.

Figure 9:
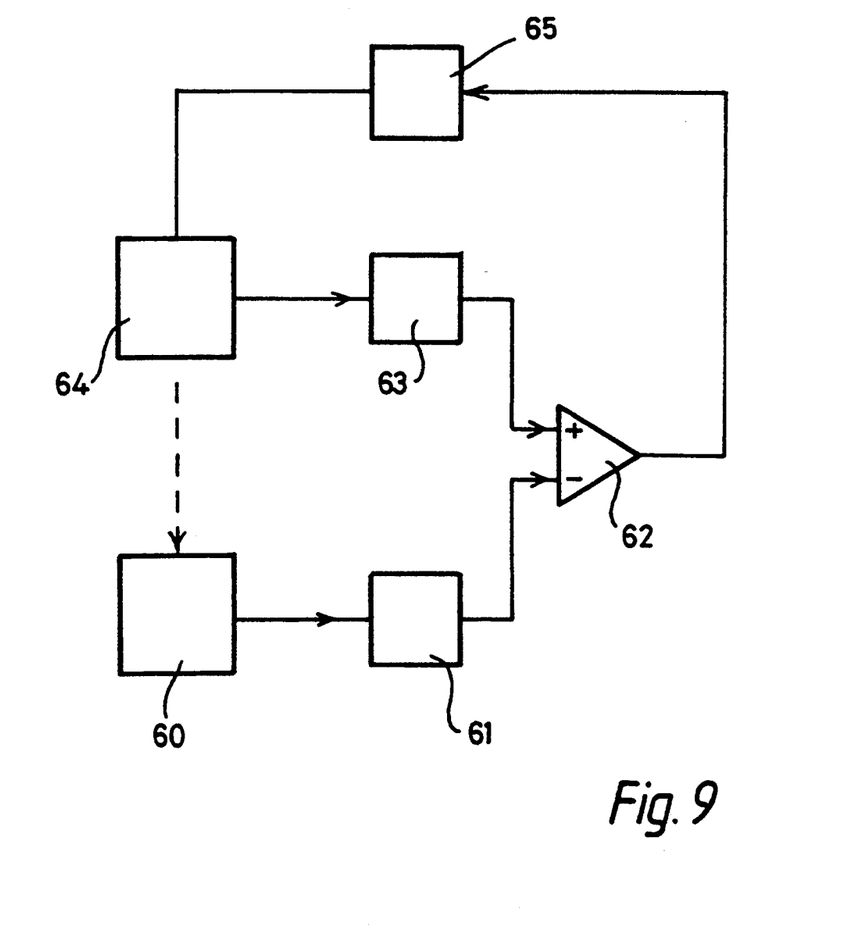
FIG. 9 shows an application of the invention to packaging.

FIG. 9 shows means for synchronising the apparatus of the invention with a packaging machine whilst maintaining a continuous flow onto the dish while the packaging machine is running. The packaging machine 60 is fitted with means 61 for transmitting the rotational angle of the machine. Such means includes an encoder or a resolver. The output from the angle transmitting means 61 is compared in a differential amplifier 62 with a signal representing the proportion of the target dose achieved at any instant. This is obtained from an integrator/divider unit 63 in which the mass flow rate derived from the motor drive signal is integrated and then divided by the target weight. The feeder, dish and motor control means is shown at 64. The output of the differential amplifier is used to provide an error signal for a feeder flow controller 65.

While the dosing means and packaging machine remain in synchronisation, then the signal representing the proportion of target dose achieved will increase during each cycle identically to the machine rotational angle signal, so that there will be zero output from the differential amplifier. If the dosing machine begins to lag or lead then an error signal will arise, causing the feeder to increase or decrease flow accordingly. If the packaging machine stops then a large error signal will appear causing the feeder to stop. When the packaging machine restarts then the error signal will reverse, causing the feeder to restart and come rapidly into synchronism. Means (not shown) are provided to zero the integrator and operate a shutter at the end of each cycle. Either analogue or digital means can be employed to implement the various components of FIG. 9.

I claim:

1. Particulate material weighing apparatus comprising:
    (a) means for delivering particulate material to a dish;
    (b) electric drive means for rotating the dish;
    (c) a controlled electric current source for powering the electric drive means;
    (d) rotational speed measuring means for measuring the instantaneous rotational speed of the electric drive means;
    (e) circuit means responsive to variation in the electric current powering the electric drive means and adapted to generate an output signal indicative of the changes in the instantaneous electric current supplied to the drive means, caused by the changes in loading as particulate material transits the dish, and (f) a servo system responsive to signals relating to the speed of rotation for controlling and holding constant the speed of rotation of the drive means, (g) said apparatus being for controlling a process in relation to an incoming or outgoing mass flow rate, wherein the output signals from the said circuit means are used to control the process.

2. Apparatus according to claim 1, including display means for indicating a value derived from the instantaneous drive current as a numerical value and scaled so as to indicate weight per unit time.

3. Apparatus according to claim 2, in which the numerical value signals are accumulated so as to produce an overall weight value for the particulate material which has passed through the apparatus.

4. Apparatus according to claim 2, wherein a cylindrical housing is employed the internal diameter of which and the characteristics of the surface material are such that the impact of particles with the cylindrical internal wall is insufficient to permit the particles to be returned to the dish.

5. Apparatus according to claims 1, including integrating circuit means capable of being reset after a weighing operation and adapted to produce an output signal whose value is the summation of the variations in the drive current caused by the acceleration of particles by the dish.

6. Apparatus according to claim 4, controlling batching by weight into a container, wherein the output signal from the integrating circuit means is used to determine when each batch weight has been reached, and control the input flow accordingly, whereafter the integrating circuit is reset in preparation for measurement of the next batch.

7. Apparatus according to claim 4, for controlling batching into a container, wherein the output signal from the integrating circuit means is used to determine when each batch weight has been reached, and control means for diverting the output flow from one container to another instantaneously, whereafter the integrating circuit is instantly reset.

8. Apparatus according to claim 4, for controlling batching into a container, wherein a shutter mechanism is provided to collect a measured batch and release it on demand into a container, which is then removed and replaced by an empty container while the next batch is accumulated on the shutter.

9. Apparatus according to claim 8, wherein container filling is part of a packaging process and control means are provided to achieve synchronisation between hatching and packaging.

10. Apparatus according to claim 9, wherein synchronisation with a packaging process is achieved by providing means on the packaging machine to signal the progress through each cycle, by signalling the angle of the drive means by means of an encoder, the encoder signal being used to control the flow of material onto the dish such that the desired total batch weight is reached and the shutter operated when required, by the progress of the packaging process.

11. Apparatus according to claim 1, in which the dish is fed from a dispensing means which produces batches of product of variable weight, batch weights being ascertained and the batches and their associated weights stored for subsequent use.

12. Apparatus according to claim 1, in which the electric current requirement to achieve constant output of the drive means varies during a single rotation due to non-constant characteristics of the drive means or due to imperfections in the speed measuring means and wherein the current requirements during a single rotation of the drive means and dish are recorded in a memory device in the form of a look-up table, the table is then read in synchronism with subsequent rotation of the drive means and the output signal used to eliminate the electric current variations during weighing cycles.

13. Apparatus according to claim 12, wherein the memory device is a read only memory (ROM), and values for insertion in the read only memory are obtained from off line measurements made on the drive means.

14. Apparatus according to claim 12, wherein the drive signal is multiplied by the output of the ROM or RAM to form a modified drive current for the motor.

15. Apparatus according to claim 12, wherein the output from the ROM or RAM is used to subtract the error from the mass flowrate signal to produce a substantially error free signal.

16. Apparatus according to claim 1, in which the electric current requirement to achieve constant output of the drive means varies during a single rotation due to non-constant characteristics of the drive means or due to imperfections in the speed measuring means and wherein data from sampled values of instantaneous electric drive current during a calibration step is stored in a RAM (random access memory).

17. Apparatus according to claim 1, wherein the dish is generally circular and is mounted for rotation about a central and generally vertical axis.

18. Apparatus according to claim 17, wherein the dish includes a central upwardly pointing conical section and a radially outer region which extends from the periphery of the central conical section and includes a plurality of circularly spaced upstanding particle engaging ribs which extend at least partly at least the outer region in a generally radial direction.

19. Apparatus according to claim 18, having low height ribs in the central section extending radially outwardly to meet higher ribs in the outer region.

20. Apparatus according to claim 1, wherein a collector is provided for receiving particulate material as it exits from the rotating dish.

21. Apparatus according to claim 20, wherein the collector comprises a housing which surrounds the dish.

22. Apparatus according to claim 21, wherein the configuration of the interior of the housing is chosen so as to ensure that particles flung off the dish are collected by the housing and not returned to the dish.

23. Apparatus according to claim 21, wherein the internal wall shape of the housing is frusto conical and the angle of the frusto conical surface is selected so as to ensure that particles impacting thereon are generally deflected downwardly.

24. Apparatus according to claim 21, wherein the housing comprises a cylindrical wall with an inwardly directed flange at the upper end which is frusto-conical in shape, and is shaped so as to optimise the change in direction of the particles impinging on it, the dish being located with the housing so as substantially to register with the frusto-conical flange.

25. Apparatus according to claim 24, wherein the angle of the frusto-conical boundary flange surface is 45° to the horizontal.

26. Apparatus according to claim 21, wherein the particles are collected within the collector by means of an inwardly directed vane extending from the inside of the cylindrical housing towards the dish to that the circular flight of particles around the interior of the housing is arrested and the direction of movement of the particles is changed to a genrally downward direction.

27. Apparatus according to claim 1, wherein the parts of the apparatus onto which the particles impact are constructed from impact absorbing material or are faced or coated with such soft material.

28. Apparatus according to claim 1, wherein particles are fed to the dish from a vibratory feeder.

29. Apparatus according to claim 1, wherein air flow affecting motor demand is reduced by the provision of a bypass in which a passage is provided for the free flow of air separate from the pathway of the material.

30. Apparatus according to claim 29 wherein a filter such as a perforated or mesh screen is fitted to prevent particles from entering the airflow bypass.

31. Apparatus according to claim 1, for use in seed drilling, in combination with a seed hopper from which seed is fed into the apparatus through a flow control device, and a drill head constitutes the outlet of the apparatus.

32. Apparatus according to claim 1, for use with particulate material, in combination with a reservoir for the particulate material located above the apparatus and flow control means between the reservoir and the apparatus to control the rate of flow of particulate material into the apparatus from which the particulate material is broadcast on exit.

33. Apparatus according to claim 32, wherein the flow control means is opened or closed in response to a control signal device from the weighing device so as to maintain a substantially constant mass flow rate of a given desired amount.

34. A method of determining the mass of a supply of particles, comprising the steps of:
   (a) rotating a dish about a vertical axis at a substantially constant speed by an electric motor;
   (b) projecting particles towards the central region of the disc so that they have a horizontal component of motion in the same general direction as that part of the surface of the disc on which they impinge;
   (c) measuring the current variations brought about by changes in torque caused by the acceleration of particles by the dish;
   (d) producing an output signal in response to variations in the drive current, the instantaneous value of which output signal is attributable to the mass of particulate material which has engaged the dish and is being accelerated thereby, and
   (e) using the output signal to control a process in relation to an incoming or outgoing mass flow.

35. A method according to claim 34, including the step of summing or integrating the output signal over a given period to produce a signal whose value is proportional to the total mass of particulate material which has reacted with the dish during the said given period.

36. A method according to claim 35, which incudes the step of displaying the instantaneous signal or the integrated value of the signal as a measurement of the mass of the particles which have reacted with the dish.

* * * * *